United States Patent
Park et al.

(10) Patent No.: US 7,435,934 B2
(45) Date of Patent: Oct. 14, 2008

(54) OPTICAL PICKUP APPARATUS WHICH IS COMPATIBLE WITH MULTIPLE TYPES OF MEDIA

(75) Inventors: Soo-Han Park, Yongin-si (KR);
Jang-Hoon Yoo, Seoul (KR);
Hag-Hyeon Jang, Seongnam-si (KR);
Ho-Sik You, Suwon-si (KR)

(73) Assignees: Samsung Electronics Co., Ltd., Suwon-si (KR); Samsung Electro-Mechanics Co. Ltd., Suwon-si (KR)

( * ) Notice: Subject to any disclaimer, the term of this patent is extended or adjusted under 35 U.S.C. 154(b) by 154 days.

(21) Appl. No.: 11/329,119

(22) Filed: Jan. 11, 2006

(65) Prior Publication Data

US 2006/0163459 A1  Jul. 27, 2006

(30) Foreign Application Priority Data

Jan. 27, 2005  (KR)  ...................... 10-2005-0007711

(51) Int. Cl.
*G11B 7/00* (2006.01)
(52) U.S. Cl. .............................. 250/201.5; 369/112.16; 369/112.2
(58) Field of Classification Search ............. 250/201.2, 250/201.5, 225; 369/112.16–112.19, 112.2, 369/112.23
See application file for complete search history.

(56) References Cited

U.S. PATENT DOCUMENTS

| | | | |
|---|---|---|---|
| 5,784,354 A | * | 7/1998 | Lee ........................ 369/112.19 |
| 2004/0160888 A1 | * | 8/2004 | Kim ........................... 369/118 |
| 2004/0190423 A1 | | 9/2004 | Yagi et al. |
| 2005/0094537 A1 | * | 5/2005 | Ikenaka et al. ......... 369/112.05 |

FOREIGN PATENT DOCUMENTS

| | | |
|---|---|---|
| CN | 1187002 | 7/1998 |
| CN | 1497553 | 5/2004 |
| CN | 1534641 | 10/2004 |
| JP | 09-212905 | 8/1997 |
| JP | 2001-273669 | 10/2001 |
| JP | 2004-145907 | 5/2004 |
| JP | 2004-319062 | 11/2004 |
| KR | 100245666 | 11/1999 |
| KR | 10-2004-0021324 | 3/2004 |

* cited by examiner

*Primary Examiner*—Kevin Pyo
(74) *Attorney, Agent, or Firm*—Roylance, Abrams, Berdo & Goodman L.L.P.

(57) ABSTRACT

An optical pickup apparatus includes a first objective lens having a low numerical aperture (NA) suitable for a low density recording medium, a second objective lens having a high NA suitable for a high density recording medium, a first light source that emits short wavelength light which is focused onto an optical recording medium by the first and second objective lenses, a first photodetector that receives a returning reflected light from the optical recording medium, and a first optical path converter for selectively guiding part of the light emitted from the first light source towards the first or the second objective lens, and guiding the reflected light towards the first photodetector.

32 Claims, 4 Drawing Sheets

OPTICAL PICKUP APPARATUS WHICH IS COMPATIBLE WITH MULTIPLE TYPES OF MEDIA

CROSS-REFERENCE TO RELATED APPLICATIONS

This application claims the benefit under 35 U.S.C. § 119 (a) of Korean Patent Application No. 2005-7711, filed on Jan. 27, 2005 in the Korean Intellectual Property Office, the entire content of which is hereby incorporated by reference.

BACKGROUND OF THE INVENTION

1. Field of the Invention

The present invention relates to an optical pickup apparatus for an optical recording and/or reproducing device. More particularly, the present invention relates to an optical pickup apparatus which is compatible with multiple types of media.

2. Description of the Related Art

An optical recording and/or reproducing apparatus records and/or reproduces information from an optical information storage medium (such as an optical disc) using a light beam focused by an objective lens. The recording density (or recording capacity) of the optical medium is determined by the size of the light spot produced by the objective lens. Equation 1 below shows the relation between the size of a light spot S, the wavelength ($\lambda$) of light, and the numerical aperture (NA) of the objective lens.

$$S \propto \lambda/NA \quad \text{[Equation 1]}$$

In general, to increase the area recording density of an optical disc, the size of the light spot formed on the optical disc needs to be reduced. As is evident by Equation 1, to reduce the light spot size, the wavelength should be short and the NA should be large. For instance, light with a short wavelength such as a blue violet laser and an objective lens with an NA of 0.6 or higher are required.

As is well known to those skilled in the art, a digital versatile disc (DVD) records and/or reproduces information using light with a wavelength of 650 nm (or 635 nm) and an objective lens with an NA of 0.6 (or 0.65 for a recordable-type DVD). Since a typical DVD is 120 mm in diameter and has a track pitch of 0.74 µm, its recording density on each side is greater than 4.7 GB.

Nevertheless, a DVD does not have sufficient capacity to record high definition movies. This is because at least 23 GB of recording density per side is needed to record a 135-minute-long high definition movie.

To meet the needs of high-density recording capacity, considerable research and studies are underway to develop and set standards for a high density optical disc, namely a next-generation DVD (hereinafter referred to as a HD-DVD), using light with a shorter wavelength than red light (that is, 405-408 nm), blue light for example, and an objective lens with an NA of 0.6 or higher and having a narrow track.

Meanwhile, to provide tolerance to accommodate for tilting of the optical disc, the thickness of the optical disc should be reduced if the NA of the objective lens is increased for high-density recording. Therefore, in consideration of an allowable tolerance due to tilting of the optical disc, the thickness of a conventional CD (1.2 mm) is reduced to 0.6 mm for a DVD and a HD-DVD. Also, the NA of an objective lens is increased from 0.45 for a conventional CD to 0.65 for a DVD and a HD-DVD. In the case of a HD-DVD, a blue light source will probably be used as a light source in view of its recording capacity. Thus, one problem in the development of an optical disc based on the new standards is the compatibility of the new optical disc with the existing optical disc.

A next-generation HD optical information recording storage medium called BD (Blue-ray Disc) using an objective lens with a 0.85 NA is actively under development. A BD uses a light source with a short wavelength (405-408 nm), that is, a blue light, and is 0.1 mm thick. This type of BD has about a 10 times greater recording density than that of a conventional DVD. Again, one problem in the development of an optical information storage medium with new standards is compatibility with existing optical information recording media.

For instance, among existing optical discs, write-once media such as DVD-Rs and CD-Rs use light sources with wavelengths of 650 nm and 780 nm because their reflectivity significantly decreases when different wavelengths are used. Therefore, if an optical pickup is designed to be compatible with DVD-Rs and/or CD-Rs, the optical pickup for a HD-DVD and the optical pickup for a BD must use two or three light sources with different wavelengths.

In practice, however, highly advanced technology is required to design and manufacture an objective lens which has a 0.85 NA and a working distance equivalent to that of the objective lens for a DVD and that at the same time is compatible with HD-DVDs, DVDs and/or CDs. Moreover, because there is no uniform standard yet for HD-DVDs and BDs using a short-wavelength (such as 405 nm), complicated optical systems and a large number of components will be required to manufacture an optical pickup which is compatible with high density recording media (both HD-DVD and BD) and conventional CDs and/or DVDs.

Accordingly, there is a need for an improved optical pickup apparatus which is compatible with different types of optical storage media.

SUMMARY OF THE INVENTION

An aspect of the present invention is to address at least the above problems and/or disadvantages and to provide at least the advantages described below. Accordingly, an aspect of the present invention is to provide an optical pickup apparatus which has a plurality of objective lenses, thereby being compatible with different kinds of optical information storage media having different recording densities.

In accordance with an aspect of the invention, an optical pickup apparatus: includes a first objective lens having a low numerical aperture (NA) suitable for a low density recording medium and a second objective lens having a high NA suitable for a high density recording medium. A first light source emits a short wavelength light and the first and second objective lenses focus the light onto an optical recording medium, which reflects the light. A first photodetector receives the returning reflected light. A first optical path converter selectively guides part of the light beams emitted from the first light source towards the first or the second objective lens and guides the reflected light towards the first photodetector.

The first optical path converter may include a polarization beam splitter for reflecting or transmitting incident light according to the polarization component of the incident light, a non-polarization beam splitter for reflecting part of the incident light and transmitting part of the incident light, a half-wave plate for selectively changing the polarization component of light being emitted from the first light source and incident on the polarization beam splitter, a first quarter-wave plate for changing the polarization component of light being focused by the first objective lens and then reflected by the optical recording medium, and a second quarter-wave plate for changing the polarization component of light being focused by the second objective lens and then reflected by the optical recording medium.

In an exemplary embodiment, the non-polarization beam splitter is wave-dependent, selectively reflecting and transmitting incident light depending on the wavelength of the light.

The non-polarization beam splitter and the non-polarization beam splitter may be integrated as one body, and the non-polarization beam splitter is preferably a flat plate for reducing manufacturing cost.

In another exemplary embodiment, first and second collimating lenses for collimating light are installed in the optical path of light which is incident on the first objective lens and the second objective lens, respectively.

The optical pickup apparatus may further include a holder for supporting the first and second collimating lenses together, and a driving unit for driving the holder to reciprocate in the direction that the light travels.

In one more exemplary embodiment, the first collimating lens is fixedly installed in the optical path, and the second collimating lens is movably installed in the optical path.

The first photodetector may include a first photodetecting element that receives returning reflected light via the first objective lens, and a second photodetecting element that receives a returning reflected light via the second objective lens.

The optical pickup apparatus may further include a first correcting element for correcting a spherical aberration of light which is incident on the first objective lens after passing through the first collimating lens, and a second correcting element for correcting a spherical aberration of light which is incident on the first photodetecting element after being reflected from the optical recording medium.

To eliminate interference between the first and second collimating lenses, the first and the second collimating lens may be separated by a greater distance than the distance between the objective lenses.

Also, a reflective member for changing an optical path may be installed between the second objective lens and the second collimating lens.

The second correcting element may be installed in the optical path between the second polarization beam splitter and the second photodetecting element.

The first optical path converter may further include a reflective member installed between the second collimating lens and the second quarter-wave plate for guiding the optical path.

In an exemplary embodiment, the first light source comprises a blue laser diode that emits blue light with a wavelength in the 400's nanometers (that is, between about 400 and 500 nanometers).

The optical pickup apparatus may further include at least one second light source that emits a longer wavelength light than the first light source for using the first objective lens, a second photodetector that receives a returning reflected light from the first objective lens after being emitted from the at least one second light source, and a second optical path converter for guiding light emitted from the at least one second light source towards the first objective lens, and guiding the returning reflected light from the optical recording medium through the first objective lens towards the second photodetector.

The second light source may include a twin laser diode that is capable of independently emitting infrared rays and red light having different wavelengths.

In further detail, the second light source may include a first laser diode that emits infrared rays having a wavelength of 730 nm or higher, and a second laser diode that emits red light having a wavelength between 600 nm and 730 nm.

In an exemplary embodiment, the second optical path converter includes an additional polarization beam splitter for reflecting or transmitting incident light according to the polarization component of the incident light, and the first quarter-wave plate is shared.

The non-polarization beam splitter may be installed in the optical path of light being emitted from the second light source and light being returned due to reflection.

The non-polarization beam splitter may be a wave-dependent cubic beam splitter, which reflects short wavelength light emitted from the first light source and transmits long wavelength light emitted from the second light source.

In an exemplary embodiment, the polarization beam splitter and the non-polarization beam splitter are integrated as one body.

The second photodetector may includes a PDIC to be used with optical recording media that have different recording densities due to the incident lights transmitted from different polarization beam splitters.

The optical pickup apparatus may further include at least one optical module that emits light with a longer wavelength than the light from the first light source and being suitable for a low density optical recording medium using the first objective lens, and that receives returned light, and a second optical path converter for guiding the optical path between the optical module and the first objective lens.

The optical module may include a first hologram module that emits light with a long wavelength of 730 nm or higher, and receives returning reflected light from the first objective lens, and a second hologram module that emits red light with a wavelength longer than the light from the first light source and shorter than the light from the first hologram module, and receives returning reflected light from the first objective lens.

Also, the second optical path converter may include a wave-dependent beam splitter installed in the optical path between the optical module and the first objective lens. The wave-dependent beam splitter reflects or transmits incident light depending on the wavelength of the incident light.

The non-polarization beam splitter may be installed in the path of light being emitted from the optical module.

In an exemplary embodiment, the first objective lens has a numerical aperture of 0.65 or lower, whereas the second objective lens has a numerical aperture of 0.85 or higher.

At least one of the first objective lens and the second objective lens may be used for reproducing information from different kinds of discs.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1:
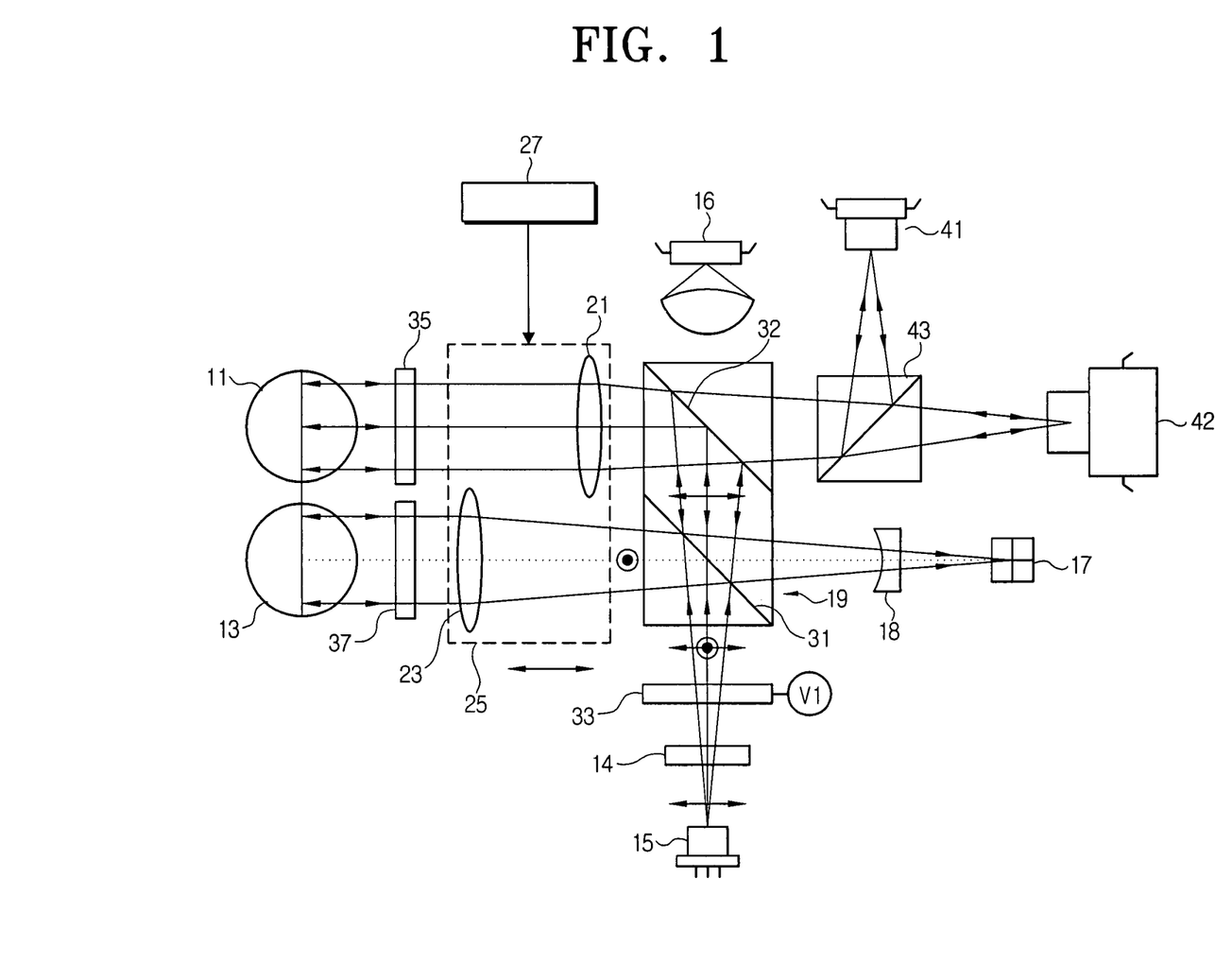
FIG. 1 is a schematic view of an optical pickup apparatus according to one exemplary embodiment of the present invention.

Referring to FIG. 1, an optical pickup apparatus of the invention is compatible with a plurality of optical information recording media, that is, optical discs, that have different recording densities and different thicknesses. The optical pickup apparatus includes a first objective lens 11 for recording and/or reproducing information on or from at least one kind of low density optical discs with different recording densities, a second objective lens 13 for recording and/or reproducing information on or from a (relatively) high density optical disc, a first light source 15, a first photodetector 17, and a first optical path converter 19.

The first objective lens 11 records and/or reproduces information on or from a low recording density optical disc of the DVD group (hereinafter referred to simply as a DVD) and additionally an optical disc of the CD group (hereinafter referred to simply as a CD). For instance, the first objective lens 11 can record and/or reproduce information on or from an optical disc of the HD-DVD group (hereinafter referred to simply as a HD-DVD) having a higher recording density than that of the DVD. Therefore, to be able to record and/or reproduce information on or from different optical discs such as CD, DVD and HD-DVD, the first objective lens 11 in this exemplary embodiment has a 0.65 NA or less, and is adequate for approximately 0.6 mm thick optical discs.

To correct a spherical aberration caused by a difference in recording density among the three types of optical discs, a first collimating lens 21 is arranged in an optical path of incident light upon the first objective lens 11. In detail, the first collimating lens 21 collimates the incident light upon the first objective lens 11 to correct the spherical aberration caused by a thickness difference between different optical discs. The first collimating lens 21 and a second collimating lens 23 (to be described) are movably installed in the optical path at the same time.

The second objective lens 13 has an about 0.85 NA or higher so that it can record and/or store information on an optical disc with high recording density such as an optical disc of the BD group (hereinafter referred to simply as a BD) having a thickness of 0.1 mm. The second objective lens 13 together with the first objective lens 11 are supported by a blade and can be moved in a track and focusing directions by an actuator (not shown). Similar to the first collimating lens 21, a second collimating lens 23 is arranged in the optical path of light incident upon the second objective lens 13 to correct the spherical aberration at the second objective lens due to a thin optical disc like a BD. The second collimating lens 23 and the first collimating lens 21 are installed on a holder 25. The holder 25 is controlled to reciprocate in the direction that light travels by a driving unit including a stepping motor 27. This configuration, that includes two collimating lenses 21, 23 that are driven at the same time, is advantageous in that it can reduce the number of components required and reduce the required installation space. Of course, only one of the two collimating lenses 21, 23 can be driven to correct the spherical aberration.

Preferably, the first light source 15 is a blue laser diode that emits blue light with a short wavelength between about 405 nm and 408 nm (more preferably, 405 nm). The blue light emitted from the first light source 15 is used for recording and/or storing information on the HD-DVD by means of the first objective lens 11. In like manner, the blue light can be used for recording and/or storing information on the BD by means of the second objective lens 13.

The first photodetector 17 receives reflected light from the HD-DVD and the BD, respectively, and detects information-carrying signals and error signals. One example of the first photodetector 17 is a PDIC (Photo Diode Integrated Circuit). The first photodetector 17 is shared between the HD-DVD and the BD. A sensing lens 18 magnifies the spot of the light received by the first photodetector 17.

The first optical path converter 19 includes a polarization beam splitter 31 for reflecting or transmitting incident light depending on its polarization component, a non-polarization beam splitter 32 for reflecting part of the incident light and transmitting another part of the incident light, a half-wave plate 33 for selectively changing the polarization component of light emitted from the first light source, and first and second quarter-wave plates 35, 37 for changing the polarization component of light that has been focused by the first and second objective lenses 11, 13, respectively, and reflected by the disc.

The polarization beam splitter 31 is a polarization-dependent beam splitter, for example, usually transmitting P waves and reflecting S waves. In other words, if the polarization component of the incident light provided from the first light source 15 is an S wave, the polarization beam splitter 31 reflects most of the incident light onto the second objective lens 13, and transmits only part of the light for monitoring the optical power.

To monitor the optical power, it is possible to adjust the transmittance of a deflection mirror below the objective lens, and transmit part of the light for monitoring.

Meanwhile, the non-polarization beam splitter 32 usually reflects the light that has passed through the polarization beam splitter 31 towards the first objective lens 11. Preferably, the non-polarization beam splitter 32 is wave dependent and transmits long wavelength light emitted from hologram modules 41, 42 (described below). For instance, the non-polarization beam splitter 32 may reflect short wavelength light (for example, around 400's nm), and transmit long wavelength light (for example, longer than 600 nm). These beam splitters 31, 32 can be combined as one body. A monitoring photodetector 16 that receives part of the light that is emitted from the first light source 15 and passed through the beam splitters 31, 32 is installed on the opposite side of the light source 15. As such, the photodetector 16 receives part of the light emitted from the first light source 15 and measures the optical power of the received light. This measurement is used to obtain information needed to control the optical power of the first light source 15.

The half-wave plate 33 starts operating when voltage is applied. It changes the polarization component of the light from the first light source 15. For example, suppose that the first light source 15 emits P-polarized light. If no voltage is applied to the half-wave plate 33, the P-polarized light is incident upon the polarization beam splitter 31. On the other hand, if the voltage is applied to the half-wave plate 33, the P-polarized light is converted into S-polarized light and is incident upon the polarization beam splitter 31. With the help of the half-wave plate 33, one of the first and second objective lenses 11., 13 is controlled to form a light spot. To this end, the half-wave plate 33 is installed in the optical path between the first light source 15 and the polarization beam splitter 31.

A grating (device) 14 is installed between the half-wave plate 33 and the first light source 15. The grating 14 is provided for the precise servo control of the objective lenses 11, 13 in their focusing and track directions. Since this technology is known to those skilled in the art, further details will be omitted for brevity.

The first quarter-wave plate 35 changes the polarization status of a P-wave incident on the first objective lens 11 via the non-polarization beam splitter 32 into light in a first (right-handed) circular wave. The light of the first circular wave is reflected from the low density optical disc and changed into light of a second (left-handed) circular wave. The first quarter-wave plate 35 changes the polarization status of the light in the second circular wave to an S wave. In short, the polarization of the returned P-wave which was incident on the first objective lens 11 via the polarization beam splitters 31, 32 is changed to an S-wave, and the polarization beam splitter 31 reflects the S-polarized light towards the first photodetector 17.

Meanwhile, the second quarter-wave plate 37 changes the polarization status of the S-wave which is incident on the second objective lens 13 via the polarization beam splitter 31 into the light of the first circular wave. The light of the second circular wave (which is the light of the first circular wave reflected by the high density optical disc) is changed to a P-polarized light by means of the second quarter-wave plate 37. Therefore, when the S-polarized light is reflected from the polarization beam splitter 31, it is changed to the P-polarized light and incident on the second objective lens 13. Then, it passes through the polarization beam splitter 31 and is received by the first photodetector 17.

The optical pickup apparatus described thus far, that includes one blue laser diode 15 and two objective lenses 11, 13 with different NAs, is compatible with both a HD-DVD and a BD.

Referring again to FIG. 1, the optical pickup apparatus includes a first hologram module 41 for recording and/or reproducing information on and/or from a low density optical disc such as a CD using the first objective lens 11, and a second hologram module 42 for recording and/or reproducing information on and/from another low density optical disc such as a DVD, and a second optical path converter 43.

The first hologram module 41 includes a light source (not shown) that emits infrared rays with a wavelength around 780 nm, and a photodetector (not shown) that receives reflected light. The first hologram module 41 is used with a low density optical disc such as a CD by means of the first objective lens 11. Similarly, the second hologram module 42 includes a light source (not shown) that emits light with a wavelength around 650 nm, and a photodetector (not shown) that receives reflected light, and is used with a low density optical disc such as a DVD by means of the first objective lens 11. Since the operations and functions of the hologram modules are well known to those skilled in the art, further details will be omitted for conciseness.

The second optical path converter 43 guides lights emitted by the first and the second hologram module 41, 42 to the first objective lens 11, and guides any returned light back to the hologram modules 41, 42, respectively. Preferably, a wave-dependent cubic beam splitter is used for the second optical path converter 43. The cubic beam splitter reflects the 780 nm light emitted from the first hologram module 41, and transmits the 650 nm light emitted from the second hologram module 42.

In addition, to manufacture a slim, small-sized optical pickup apparatus, part of the path of the reflected, returned lights which were originally emitted from the first and second hologram modules 41, 42 is shared with the second optical path converter 19. That is to say, the non-polarization beam splitter 32, the first collimating lens 21 and the first quarter-wave plate 35 are arranged between the cubic beam splitter 43 and the first objective lens 11. In particular, the optical elements including the non-polarization beam splitter 32 and the quarter-wave plate 35 are installed in such a manner that they do not interfere with long wavelength light such as infrared rays and red light. In detail, similar to the cubic beam splitter 43, the non-polarization beam splitter 32 is preferably wave-dependent, and is capable of transmitting long wavelength light (for example, $\geqq 600$ nm) and reflecting short wavelength light (for example, $\leqq 405$ nm). Meanwhile, if long wavelength light is being used, no voltage is applied to the first quarter-wave plate 35 so that the polarization component and the optical path of the light are not influenced by the first quarter-wave plate 35.

In the meantime, the first collimating lens 21 and the second collimating lens 23 are driven by the stepping motor 27, and correct spherical aberration by their movement.

Therefore, the optical pickup apparatus according to the first exemplary embodiment of the present invention is provided with two objective lenses 11, 13 and at least three light sources so that it is compatible with at least four kinds of optical discs having different recording densities from one another.

Figure 2A:
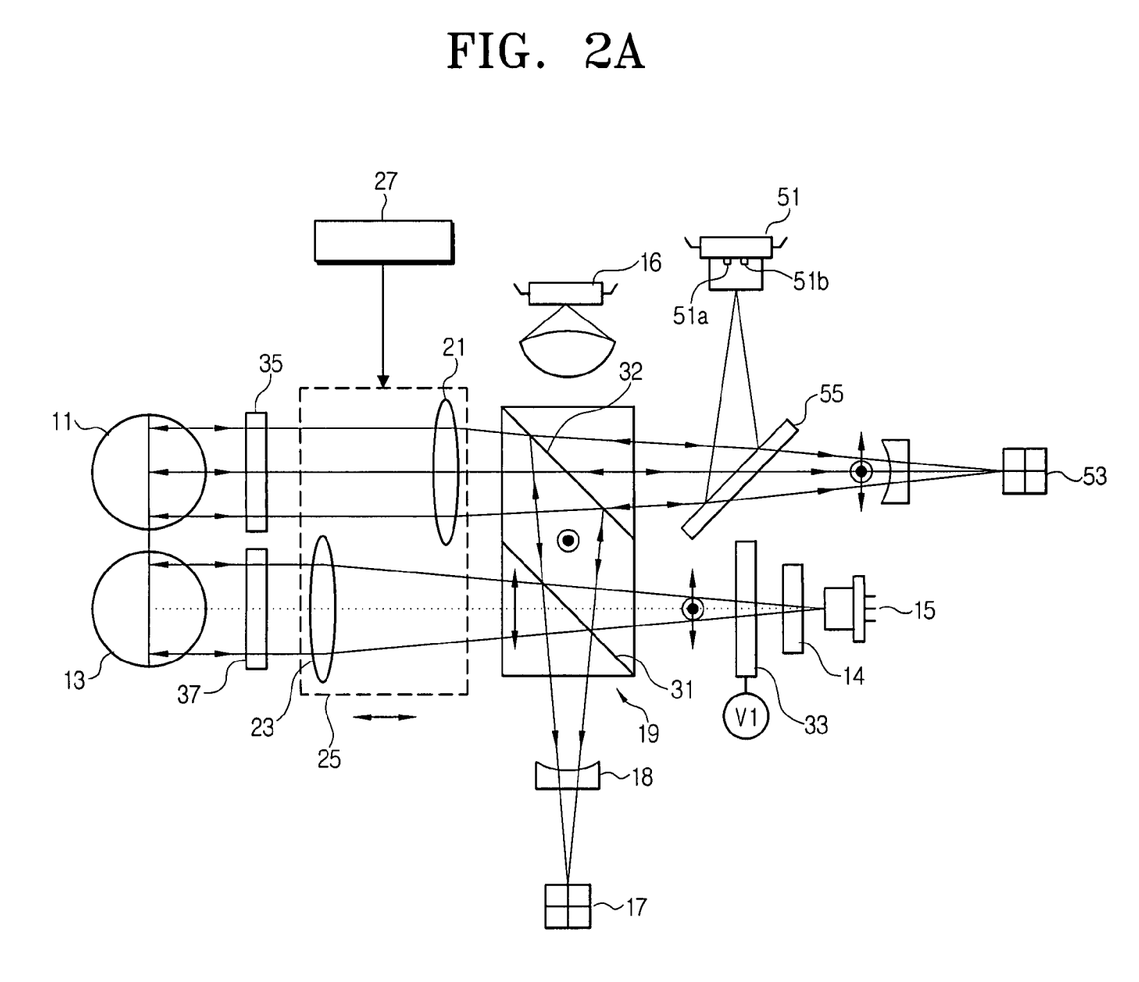
FIG. 2A is a schematic view of an optical pickup apparatus according to another exemplary embodiment of the present invention.
Figure 2B:
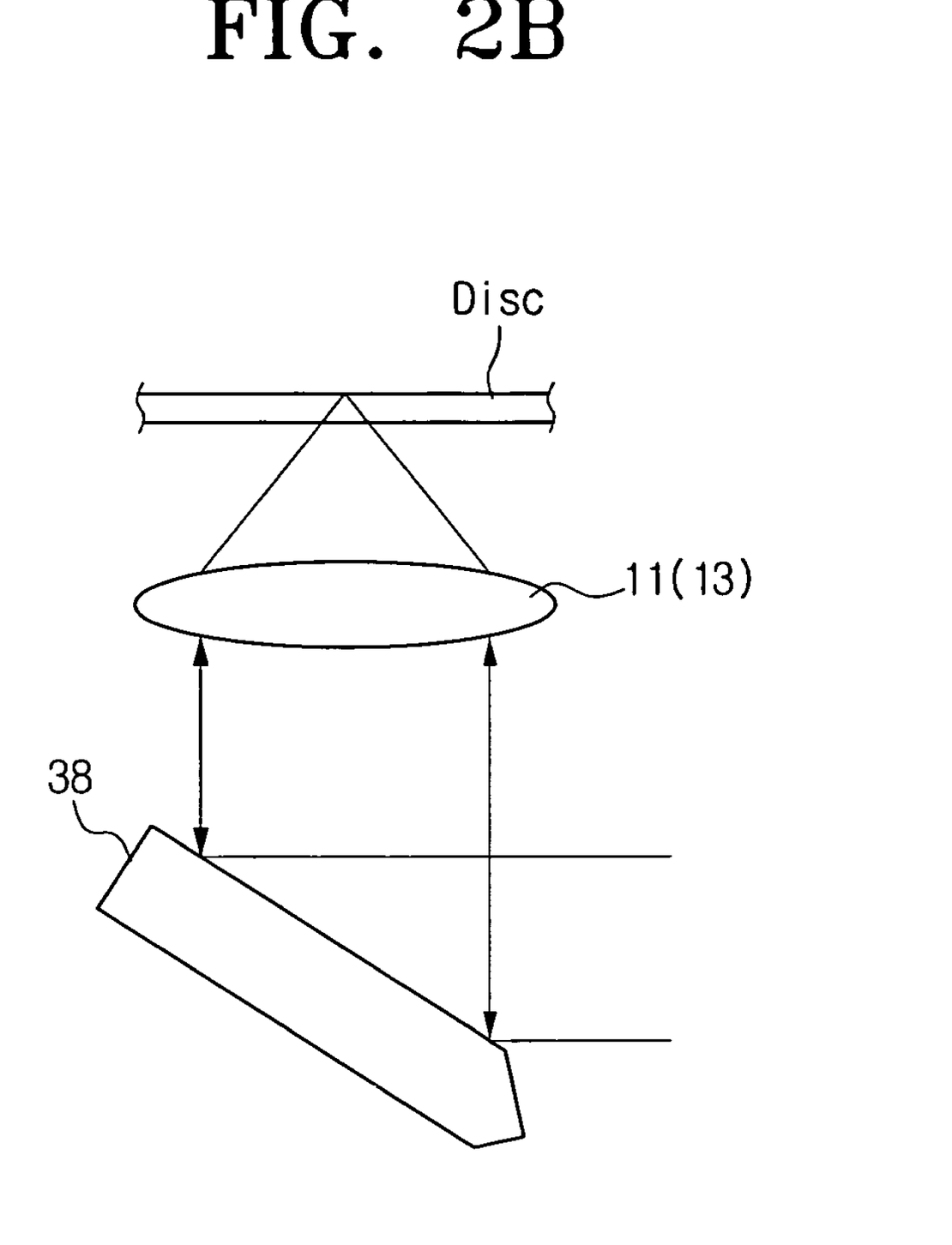
FIG. 2B diagrammatically explains an optical path of incident light on the objective lens shown in FIG. 2A.

FIGS. 2A and 2B illustrate an optical pickup apparatus according to a second exemplary embodiment of the present invention. In FIGS. 2A and 2B, the same reference numerals are given to the same constituent elements used in the optical pickup apparatus of FIG. 1.

As shown in FIG. 2A, the position of the first light source 15 (for example, a blue laser diode) and the position of the first photodetector 17 are different than those in FIG. 1. In this case, the half-wave plate 33 and the grating 14 are arranged in the optical path between the first light source 15 and the polarization beam splitter 31.

Meanwhile, the optical pickup apparatus of FIGS. 2A and 2B uses a second light source 51 for use in a low density optical disc with the help of a first objective lens 11, a second photodetector 53, and a second optical path converter 55. Preferably, the second light source 51 is a twin laser diode which includes a first laser diode 51a that emits infrared rays with a wavelength of about 780 nm and a second laser diode 51b that emits red light with a wavelength of about 650 nm, so that the optical pickup apparatus of the second exemplary embodiment is compatible with both CDs and DVDs.

As for the second photodetector 53, a PDIC which is compatible with both CDs and DVDs is preferably used. The optical pickup apparatus of FIGS. 2A and 2B is also provided with an optical path converter or a reflective mirror 38 installed below the objective lenses 11, 13, as shown in FIG. 2B. Here, the optical path converter or the reflective mirror 38 reflects light that is incident in the same direction to selectively send the light to the first objective lens 11 or to the second objective lens 13. The reflective mirror 38 is formed integrally on the objective lens, so that incident light on the objective lens maintains the same tilt angle.

The first objective lens 11 or the second objective lens 13 is characterized by reproducing information from more than one kind of disc, respectively. For instance, the first objective lens 11 having a low NA is compatible with both a HD-DVD and a DVD, whereas the second objective lens 13 having a high NA is compatible with a BD. Optionally, the second objective lens 13 can be compatible with a BD and a HD-DVD, whereas the first objective lens 11 is compatible with a HD-DVD, a DVD, and a CD.

The second optical path converter 55 reflects long wavelength light beams emitted from the second light source 51 (that is, the two wavelength laser diode) onto the first objective lens 11, and transmits any returned light towards the second photodetector 53. Preferably, the second optical path converter 55 is a plate type polarization beam splitter. Here, the polarized light from the two wavelength laser diode is reflected by the optical disc, and its polarization status is then changed by the first quarter-wave plate 35. The changed light is transmitted through the polarization beam splitter 55 and travels to the second photodetector 53. Although the non-polarization beam splitter 32 is installed in the optical path of the long wavelength light, most of the long wavelength light beams are transmitted through the beam splitter 32 because of the polarization-independent nature of the beam splitter 32. Part of the long wavelength light beams is reflected from the non-polarization beam splitter 32, and is incident on the monitoring photodetector 16. Therefore, the photodetector 16 can control the optical power of the two wavelength laser diode used as the second light source 51.

Figure 3:
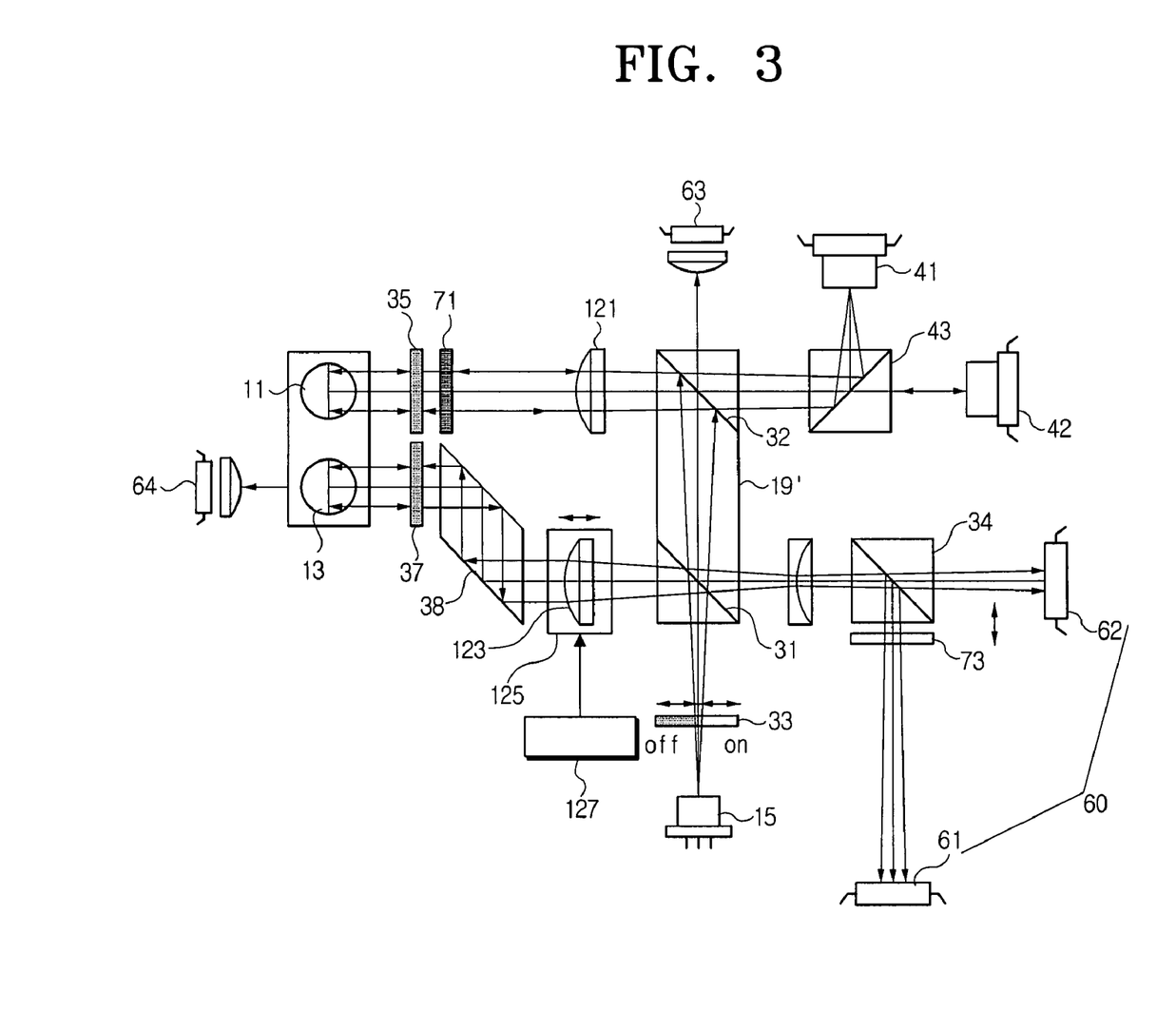
FIG. 3 is a schematic view of an optical pickup apparatus according to still another exemplary embodiment of the present invention.

FIG. 3 illustrates an optical pickup apparatus according to a third exemplary embodiment of the present invention. Again, the same reference numerals are used with the same constituent elements used in the optical pickup apparatus of FIG. 1.

The optical pickup apparatus in FIG. 3 includes a first photodetector 60 composed of first and second photodetecting elements 61, 62. Light beams emitted from the first light source 15 are focused by the objective lenses 11, 13, respectively, and reflected from the optical disc. The returned lights are then received by the first and second photodetecting elements 61, 62. In particular, the first photodetecting element 61 is used for a BD and the second objective lens 13, and the second photodetecting element 62 is used for a HD-DVD and the first objective lens 11.

Also, a first optical path converter 19' for converting (or changing) the optical path of blue light emitted from the first light source 15 includes a first polarization beam splitter 31', a non-polarization beam splitter 32, a half-wave plate 33, a second polarization beam splitter 34, first and second quarter-wave plates 35, 37, and a reflective member 38. Here, the first polarization splitter 31' has the same function as the polarization beam splitter 31 shown in Fig. 1. The second polarization beam splitter 34 is polarization dependent, similar to the first polarization beam splitter 31'. Therefore, among the returned polarized light beams, the polarized light reflected by the first polarization beam splitter 31' is also reflected by the second polarization beam splitter 34, and received by the second photodetecting element 61. Overall, the polarized light beams that are transmitted through the first and second polarization beam splitters 31', 34 are received by the second photodetecting element 62.

The reflective member 38 is provided to change the optical path between a second collimating lens (to be described) and the second objective lens 13. By installing the reflective member 38, a space is secured so that the collimating lens 123 can be driven independently without interference.

When using a BD, the second collimating lens 123 is movably installed in the path of light which is incident on the second objective lens 13 in such a manner to correct the spherical aberration due to the second objective lens 13. In detail, the second collimating lens 123 is supported by a holder 125, and moves selectively under the control of a driving unit including a stepping motor 127.

On the other hand, according to this particular exemplary embodiment of the invention, the first collimating lens 121 is fixedly installed in the path of light that is incident on the first objective lens 11. Therefore, space is required to drive the second collimating lens 123 only. To this end, the collimating lenses 121, 123 are separated from each other by a greater distance than the distance between the objective lenses 11, 13. Because the driving unit drives only the second collimating lens 123, it has a relatively simple structure and has less driving load.

Meanwhile, since that the first collimating lens 121 is fixed, the optical pickup apparatus further includes first and second correcting elements 71, 73 for correcting the spherical aberration generated in the HD-DVD using the first objective lens 11. The first correcting element 71 is installed in the optical path between the first collimating lens 121 and the first objective lens 11 to correct the spherical aberration of light which is incident on the first objective lens 11. Similarly, the second correcting element 73 is installed in the optical path between the second beam splitter 34 and the first photodetecting element 61 to correct the spherical aberration of light which is received by the first photodetecting element 61.

In FIG. 3, a photodetector 63 monitors the value of optical power from the first light source 15 when a HD-DVD is used, and a photodetector 64 monitors the value of optical power from the first light source 15 when a BD is used.

Therefore, the optical pickup apparatus according to the present invention is compatible with both a BD and a HD-DVD.

Also, the blue laser diode and the photodetector can be used with both a BD and a HD-DVD.

Moreover, it takes only one driving unit to simultaneous drive collimating lenses to correct the spherical aberration due to the dual layer of the optical disc. Thus, the driving unit, too, can be-used with both a BD and a HD-DVD.

Additionally, in the optical pickup apparatuses shown in FIGS. 1 and 2A, the monitoring photodetector can be shared by three laser diodes.

Furthermore, by integrating the polarization beam splitter and the non-polarization beam splitter, the optical pickup apparatuses can be used with both a BD and a HD-DVD.

Consequently, the optical pickup apparatus of the present invention has many shared parts and requires a smaller number of parts than conventional optical pickup apparatuses. This allows the manufacture of a light, small-sized optical pickup apparatus.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An optical pickup apparatus, comprising:
  a first objective lens having a low numerical aperture (NA) suitable for a low density recording medium;
  a second objective lens having a high NA suitable for a high density recording medium;
  a first light source that emits short wavelength light for use with the first and second objective lenses, the light being focused onto an optical recording medium by the first and second objective lenses, the optical recording medium reflecting the light;

a first photodetector that receives the reflected light; and
a first optical path converter selectively guiding part of the light emitted by the first light source on a first or second light path towards the first or the second objective lens, respectively, and guiding the reflected light towards the first photodetector;
wherein the first optical path converter is stationary with respect to a direction perpendicular to an optical axis of the first objective lens.

2. An optical pickup apparatus, comprising:
a first objective lens having a low numerical aperture (NA) suitable for a low density recording medium;
a second objective lens having a high NA suitable for a high density recording medium;
a first light source that emits short wavelength light for use with the first and second objective lenses, the light being focused onto an optical recording medium by the first and second objective lenses, the optical recording medium reflecting the light;
a first photodetector that receives the reflected light; and
a first optical path converter selectively guiding part of the light emitted by the first light source towards the first or the second objective lens, and guiding the reflected light towards the first photodetector;
wherein the first optical path converter comprises:
a polarization beam splitter for reflecting or transmitting incident light according to the polarization component of the incident light;
a non-polarization beam splitter for reflecting part of the incident light and transmitting part of the incident light;
a half-wave plate for selectively changing the polarization component of light being emitted from the first light source and incident on the polarization beam splitter;
a first quarter-wave plate for changing the polarization component of light being focused by the first objective lens and light reflected by the optical recording medium; and
a second quarter-wave plate for changing the polarization component of light being focused by the second objective lens and light reflected by the optical recording medium.

3. The apparatus according to claim 2, wherein the non-polarization beam splitter is wave-dependent, selectively reflecting and transmitting incident light by wavelengths.

4. The apparatus according to claim 2, wherein the polarization beam splitter and the non-polarization beam splitter are integrated as one body.

5. An optical pickup apparatus, comprising:
a first objective lens having a low numerical aperture (NA) suitable for a low density recording medium;
a second objective lens having a high NA suitable for a high density recording medium;
a first light source that emits short wavelength light for use with the first and second objective lenses, the light being focused onto an optical recording medium by the first and second objective lenses, the optical recording medium reflecting the light;
a first photodetector that receives the reflected light; and
a first optical path converter selectively guiding part of the light emitted by the first light source towards the first or the second objective lens, and guiding the reflected light towards the first photodetector;
wherein a first and a second collimating lens for collimating light are installed in the optical path of light which is incident on the first objective lens and the second objective lens, respectively.

6. The apparatus according to claim 5, further comprising:
a holder for supporting the first and second collimating lenses together; and
a driving unit for driving the holder to reciprocate in the direction that the light travels.

7. The apparatus according to claim 5, wherein the first collimating lens is fixedly installed in the optical path, and the second collimating lens is movably installed in the optical path.

8. The apparatus according to claim 7, wherein the first photodetector comprises:
a first photodetecting element that receives returning reflected light via the first objective lens; and
a second photodetecting element that receives returning reflected light via the second objective lens.

9. The apparatus according to claim 8, further comprising:
a first correcting element for correcting a spherical aberration of light which is incident on the first objective lens after being transmitted through the first collimating lens; and
a second correcting element for correcting a spherical aberration of light which is incident on the first photodetecting element after being reflected from the optical recording medium.

10. The apparatus according to claim 7, wherein the first and the second collimating lenses are separated by a greater distance than a distance between the objective lenses to provide space to eliminate interference between the first and second collimating lenses.

11. The apparatus according to claim 10, wherein a reflective member for changing an optical path is installed between the second objective lens and the second collimating lens.

12. The apparatus according to claim 11, wherein the first optical path converter comprises:
a first polarization beam splitter installed in the optical path between the first light source and the first and second objective lenses, respectively, for reflecting or transmitting incident light according to the polarization component of the incident light;
a non-polarization beam splitter installed between the first polarization beam splitter and the first objective lens for reflecting part of the incident light and transmitting part of the incident light;
a second polarization beam splitter installed between the first polarization beam splitter and the first and second photodetecting elements, respectively;
a half-wave plate for selectively changing the polarization component of light being emitted from the first light source and incident on the first polarization beam splitter;
a first quarter-wave plate for changing the polarization component of light being focused by the first objective lens and then reflected by the optical recording medium; and
a second quarter-wave plate for changing the polarization component of light being focused by the second objective lens and then reflected by the optical recording medium.

13. The apparatus according to claim 12, further comprising:
a first correcting element for correcting a spherical aberration of light which is incident on the first objective lens after being transmitted through the first collimating lens; and
a second correcting element for correcting a spherical aberration of light which is incident on the first photodetecting element after being reflected from the optical recording medium, the second correcting element is installed in the optical path between the second polarization beam splitter and the first photodetecting element.

14. The apparatus according to claim 12, wherein the first optical path converter further comprises:
a reflective member installed between the second collimating lens and the second quarter-wave plate for guiding the optical path.

15. An optical pickup apparatus, comprising:
a first objective lens having a low numerical aperture (NA) suitable for a low density recording medium;
a second objective lens having a high NA suitable for a high density recording medium;
a first light source that emits short wavelength light for use with the first and second objective lenses, the light being focused onto an optical recording medium by the first and second objective lenses, the optical recording medium reflecting the light;
a first photodetector that receives the reflected light; and
a first optical path converter selectively guiding part of the light emitted by the first light source on a first or second light path towards the first or the second objective lens, respectively, and guiding the reflected light towards the first photodetector;
wherein the first light source comprises a blue laser diode that emits blue light.

16. The apparatus according to claim 15, wherein the blue laser diode emits light with a wavelength in the range of about 400 to 500 nanometers.

17. An optical pickup apparatus, comprising:
a first objective lens having a low numerical aperture (NA) suitable for a low density recording medium;
a second objective lens having a high NA suitable for a high density recording medium;
a first light source that emits short wavelength light for use with the first and second objective lenses, the light being focused onto an optical recording medium by the first and second objective lenses, the optical recording medium reflecting the light;
a first photodetector that receives the reflected light;
a first optical path converter selectively guiding part of the light emitted by the first light source towards the first or the second objective lens, and guiding the reflected light towards the first photodetector;
at least one second light source that emits longer wavelength light than the first light source for use with the first objective lens;
a second photodetector that receives a returning reflected light from the first objective lens after being emitted from the at least one second light source; and
a second optical path converter for guiding light emitted from the at least one second light source towards the first objective lens, and guiding the returning reflected light from the optical recording medium through the first objective lens towards the second photodetector.

18. The apparatus according to claim 17, wherein the second light source comprises a twin laser diode that is capable of independently emitting infrared rays and red light having different wavelengths.

19. The apparatus according to claim 17, wherein the second light source comprises:
a first laser diode that emits infrared rays having a wavelength of about 730 nm or higher; and
a second laser diode that emits red light having a wavelength between about 600 nm and about 730 nm.

20. The apparatus according to claim 17, wherein the first optical path converter comprises:

a polarization beam splitter for reflecting or transmitting incident light according to the polarization component of the incident light;
a non-polarization beam splitter for reflecting part of the incident light and transmitting part of the incident light;
a half-wave plate for selectively changing the polarization component of light being emitted from the first light source and incident on the polarization beam splitter;
a first quarter-wave plate for changing the polarization component of light being focused by the first objective lens and then reflected by the optical recording medium; and
a second quarter-wave plate for changing the polarization component of light being focused by the second objective lens and then reflected by the optical recording medium.

21. The apparatus according to claim 20, wherein the second optical path converter comprises an additional polarization beam splitter for reflecting or transmitting incident light according to the polarization component of the incident light, and the first quarter-wave plate is shared.

22. The apparatus according to claim 21, wherein the non-polarization beam splitter is installed in the optical path of light being emitted from the second light source and returned due to reflection.

23. The apparatus according to claim 22, wherein the non-polarization beam splitter is a wave-dependent cubic beam splitter, which reflects short wavelength light emitted from the first light source and transmits long wavelength light emitted from the second light source.

24. The apparatus according to claim 22, wherein the polarization beam splitter and the non-polarization beam splitter are integrated as one body.

25. The apparatus according to claim 21, wherein the second photodetector comprises a PDIC which is shared with optical recording media that have different recording densities due to the incident lights transmitted from different polarization beam splitters.

26. An optical pickup apparatus, comprising:
a first objective lens having a low numerical aperture (NA) suitable for a low density recording medium;
a second objective lens having a high NA suitable for a high density recording medium;
a first light source that emits short wavelength light for use with the first and second objective lenses, the light being focused onto an optical recording medium by the first and second objective lenses, the optical recording medium reflecting the light;
a first photodetector that receives the reflected light;
a first optical path converter selectively guiding part of the light emitted by the first light source towards the first or the second objective lens, and guiding the reflected light towards the first photodetector;
at least one optical module that emits light with a longer wavelength than the light from the first light source and being suitable for a low density optical recording medium using the first objective lens, and that receives returned light; and
a second optical path converter for guiding the optical path between the optical module and the first objective lens;
wherein the first optical path converter is stationary with respect to a direction perpendicular to an optical axis of the first objective lens.

27. An optical pickup apparatus, comprising:
a first objective lens having a low numerical aperture (NA) suitable for a low density recording medium;

a second objective lens having a high NA suitable for a high density recording medium;

a first light source that emits short wavelength light for use with the first and second objective lenses, the light being focused onto an optical recording medium by the first and second objective lenses, the optical recording medium reflecting the light;

a first photodetector that receives the reflected light;

a first optical path converter selectively guiding part of the light emitted by the first light source towards the first or the second objective lens, and guiding the reflected light towards the first photodetector;

at least one optical module that emits light with a longer wavelength than the light from the first light source and being suitable for a low density optical recording medium using the first objective lens, and that receives returned light; and a second optical path converter for guiding the optical path between the optical module and the first object;

wherein the optical module comprises:

a first hologram module that emits light with a long wavelength of 730 nm or higher, and receives a returning reflected light from the first objective lens; and a second hologram module that emits red light with a wavelength longer than the light from the first light source and shorter than the light from the first hologram module, and receives a returning reflected light from the first objective lens.

28. The apparatus according to claim 26, wherein the first optical path converter comprises:

a polarization beam splitter for reflecting or transmitting incident light according to the polarization component of the incident light;

a non-polarization beam splitter for reflecting part of the incident light and transmitting part of the incident light;

a half-wave plate for selectively changing the polarization component of light being emitted from the first light source and incident on the polarization beam splitter;

a first quarter-wave plate for changing the polarization component of light being focused by the first objective lens and then reflected by the optical recording medium; and a second quarter-wave plate for changing the polarization component of light being focused by the second objective lens and then reflected by the optical recording medium.

29. The apparatus according to claim 28, wherein the second optical path converter comprises a wave-dependent beam splitter installed in the optical path between the optical module and the first objective lens, for reflecting or transmitting incident light by wavelengths of the incident light.

30. The apparatus according to claim 29, wherein the non-polarization beam splitter is installed in the path of light being emitted from the optical module.

31. An optical pickup apparatus, comprising:

a first objective lens having a low numerical aperture (NA) suitable for a low density recording medium;

a second objective lens having a high NA suitable for a high density recording medium;

a first light source that emits short wavelength light for use with the first and second objective lenses, the light being focused onto an optical recording medium by the first and second objective lenses, the optical recording medium reflecting the light;

a first photodetector that receives the reflected light; and a first optical path converter selectively guiding part of the light emitted by the first light source on a first or second light path towards the first or the second objective lens, respectively, and guiding the reflected light towards the first photodetector;

wherein the first objective lens has a numerical aperture of 0.65 or lower, and the second objective lens has a numerical aperture of 0.85 or higher.

32. The apparatus according to claim 1, wherein at least one of the first objective lens and the second objective lens is used for reproducing information from different kinds of media.

* * * * *